(12) United States Patent
Leason

(10) Patent No.: US 6,678,505 B1
(45) Date of Patent: Jan. 13, 2004

(54) EXTRAVEHICULAR COMMUNICATION SYSTEM AND METHOD

(76) Inventor: David Leason, 28 Garey Dr., Chappaqua, NY (US) 10514

( * ) Notice: Subject to any disclaimer, the term of this patent is extended or adjusted under 35 U.S.C. 154(b) by 406 days.

(21) Appl. No.: 09/681,509

(22) Filed: Apr. 18, 2001

(51) Int. Cl.[7] ................................. H04B 1/34
(52) U.S. Cl. ........................ 455/99; 455/95; 455/96; 455/502; 455/345
(58) Field of Search ................ 455/99, 95, 91, 455/569.2, 90, 475, 550, 525.9, 11.1, 66.1, 344, 96, 152.1, 345, 346, 13.2, 67.16, 208, 265, 502; 340/311.2, 22

(56) References Cited

U.S. PATENT DOCUMENTS

| | | | | |
|---|---|---|---|---|
| 4,455,454 A | * | 6/1984 | Umebayashi | 455/556.1 |
| 5,548,810 A | * | 8/1996 | Riddell et al. | 455/99 |
| 6,032,054 A | * | 2/2000 | Schwinke | 455/557 |
| 6,108,566 A | * | 8/2000 | Albanese et al. | 455/569.2 |
| 6,177,867 B1 | * | 1/2001 | Simon et al. | 340/468 |
| 6,202,008 B1 | * | 3/2001 | Beckert et al. | 701/33 |
| 6,349,223 B1 | * | 2/2002 | Chen | 455/569.2 |
| 6,434,400 B1 | * | 8/2002 | Villevieille et al. | 455/550.1 |

* cited by examiner

Primary Examiner—Pablo Tran
(74) Attorney, Agent, or Firm—Darby & Darby

(57) ABSTRACT

A communication system and methods are disclosed for use with vehicles. The communication system includes a first communicator attached to the car and a second communicator that is selectively mounted to a harness in the car. When the second communicator is disengaged from the harness, the communicators are synchronized to a common operative channel or frequency with low-noise, and are ready to be put in service. One disclosed method provides a simple to use communication system that provides toll-free, local communication between a person within the vehicle and a passenger who has left the vehicle. Another disclosed method permits toll-free, local communication between people in two different vehicles.

12 Claims, 2 Drawing Sheets

EXTRAVEHICULAR COMMUNICATION SYSTEM AND METHOD

BACKGROUND OF INVENTION

The present invention relates to electronic communication systems, and, more particularly, to a system and method for providing toll-free, local communication between a person within a vehicle and a passenger who has left the vehicle.

Drivers often need to maintain contact with their passengers when the passenger leaves the vehicle. For example, when conducting errands, a passenger might enter a store only to have to come back to the car to ask an awaiting driver a question. Cellular telephones can be used to keep drivers and passengers in communication with each other, but the use of cellular telephones is attendant with difficulties. For example, there must be two cellular phones available for use, there may be no service where the car is parked, and the telephones' battery might be drained. Moreover, the use of cellular phones requires dialing and often is associated with usage charges. radios also can be used to maintain communication between the driver and the passenger; however, in order for those devices to function, they must be tuned to a common frequency, have charged batteries, and be carried by both the driver and the passenger. Manually tuning the two-way radios to a common frequency with low noise at the present location of the vehicle creates a further impediment to their use.

What is needed in the art is a convenient communication system and method that enables communication between a person in a vehicle and a passenger outside of the vehicle. The present invention satisfies this and other needs.

The present invention relates to electronic communication systems, and, more particularly, to a system and method for providing toll-free, local communication between a person within a vehicle and a passenger who has left the vehicle.

SUMMARY OF INVENTION

In accordance with one aspect of the present invention, a communication system is combined with a car and includes a first communicator which is fixedly connected to the car, a harness which is also fixedly connected to the car and which has a first set of contacts, a second communicator which has its own, second set of contacts arranged to engage the first set of contacts when the second communicator is seated in the harness, and a synchronization circuit. The second communicator is movably positionable relative to the car when removed from the harness to permit a passenger to communicate with a person in the vehicle while the passenger is outside of the vehicle. The communicators convey audio messages over any one of a plurality of channels at any given moment, and the synchronization circuit is coupled to the communicators and operates to synchronize or maintain a common, low-noise communication channel in both communicators while the second communicator is absent from the harness.

In accordance with another aspect of the present invention, a method is provided for communicating with a person in a car from a remote location. The method includes the steps of providing a car with a first communicator fixedly connected to the car, a harness that is fixedly connected to the car, and a second communicator that is movably positionable relative to the car and selectively enagagable with the harness. Just as in the communication system referred to above, the first and second communicators are operable to communicate with each other over any one of a plurality of channels at any given moment. The method includes the further steps of synchronizing the frequency at which the first and second communicators communicate while the second communicator is absent from the harness and automatically activating the first and second communicators at the synchronized frequency while the second communicator is absent from the harness.

In accordance with a further aspect of the present invention, a method for a person in one vehicle to communicate with a person in another vehicle is disclosed. That method comprises the steps of providing at least a first communicator in an initiating vehicle and in a recipient vehicle, the communicators being operable over a range of frequencies, transmitting a control signal from the initiating vehicle, the control signal identifying the transmission frequency that is presently being used by the initiating vehicle, receiving the control signal at the recipient vehicle, and synchronizing a presently operative transmission frequency in the communicator in the recipient vehicle to coincide with the transmission frequency presently being used by the communicator in the initiating vehicle.

These and other aspects, features, steps and advantages can be appreciated further from the accompanying Drawing Figures and Detailed Description of Certain Embodiments.

DETAILED DESCRIPTION

By way of overview and introduction, the present invention provides an extravehicular communication system for enabling a person within a vehicle to establish and maintain wireless communication with a person remote from the vehicle, free of any dialing, tuning or other manual addressing scheme. The invention provides a matched pair of electronic communicators that convey audio messages from one to the other over a plurality of frequencies using any conventional communication protocol such as frequency modulation, amplitude modulation, or a digital protocol. Preferably, communication is established without any toll charges and independent of any need to manually synchronize the two communicators.

Figure 1:
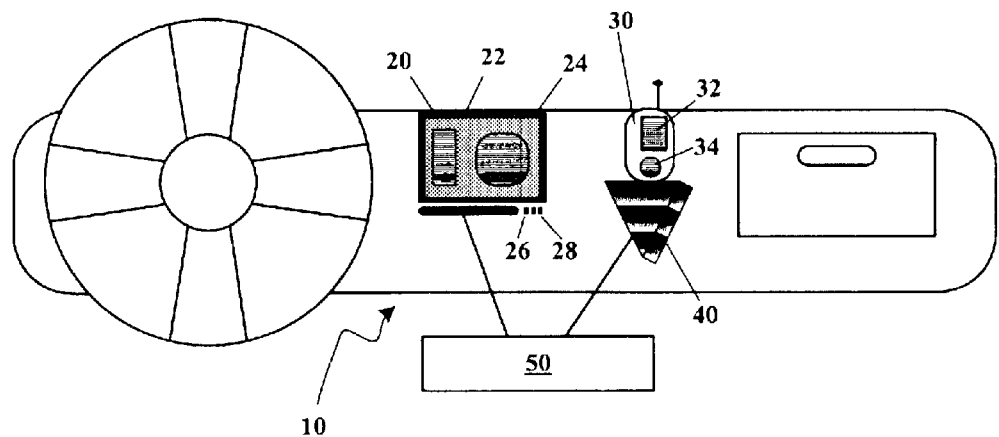
FIG. 1 is a stylized view of a car dashboard equipped with a communication system in accordance with the preferred embodiment of the invention.

FIG. 1 illustrates a vehicle dashboard 10 that includes a matched pair of communicators 20, 30 in accordance with a preferred embodiment. In this embodiment, the first communicator 20 is fixedly coupled to the dashboard 10, and hence the vehicle, whereas the second communicator 30 can be removed from a cradle 40. Both communicators include conventional hardware and software to implement basic communication functionality. Likewise, both communicators include a microphone 22, 32 and a speaker 24, 34. Preferably, the microphone 22 of the first communicator is configured or driven such that it has sufficient gain to pickup voices emanating anywhere within the car's interior, and especially from the driver in the driver's seat. Preferably, the audio input circuits that include the microphones 22, 32 are connected to a band pass filter with poles positioned to filter frequencies above and below the normal range of human voices. The second communicator 30 preferably has a gain setting for its microphone 32 that is suitable for picking up voice signals proximate to the microphone but not voices remote from the microphone.

Preferably, the communicators 20, 30 are two-way radios which operate at a frequency and within a band sanctioned by the Federal Communications Commission, and more preferably over a license-free frequency band (or "channel") such as "Family Radio Service" ("FRS"). Seven such channels have been allocated for FRS in the range of 462.5625 MHz to 462.7125 MHz, at 25.0 KHz intervals, and seven more channels have been allocated for FRS in the range of at 467.5625 MHz to 467.7125 MHz, at 25.0 KHz intervals. A plurality of subchannels (also known as CTCSS channels) can be assigned, for example, with carrier frequencies selectable in the range of 67 Hz to 250.3 Hz. FRS is a presently preferred band because it permits common frequency modulation of messages between the two communicators while providing relatively clear signals even in noisy environments.

When the second communicator 30 is in a harness or seat 42 of the cradle 40, a set of contacts 36 on the second communicator engage mating contacts 46 in the harness.

Figure 2:
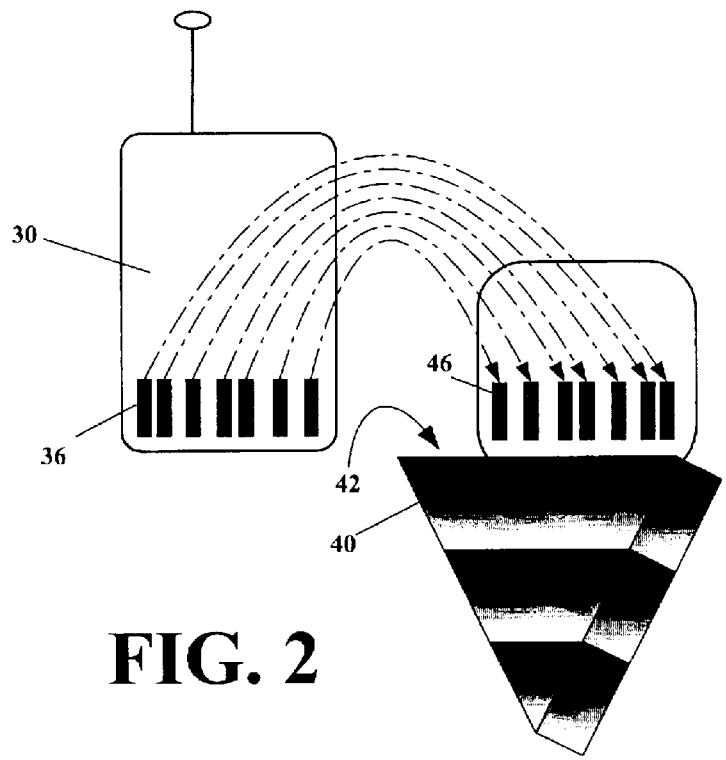
FIG. 2 is a stylized rear view of a portable communicator constructed in accordance with the preferred embodiment.

In the preferred embodiment, the harness 42 is fixedly connected to the car and includes a first set of contacts 46 that engage a mating second set of contacts 36 on the rear panel of the second communicator 30. When the second communicator is seated in the harness 42, the first set of contacts 36 engage the second set of contacts 46, as shown by the phantom lines in FIG. 2 which illustrate the connection between the contacts 36, 46.

The engagement between the contacts 36 of the second communicator 30 and the contacts 46 of the cradle 40 permits the second communicator to draw upon the same electrical resources as the first communicator 20. More particularly, when seated in the cradle, a battery internal to the second communicator can receive charge from the car's electrical system (not shown) to ensure that it is always charged when unseated and put into service. Such circuitry is conventional. See, e.g., U.S. Pat. No. 6,031,357, entitled "Battery Charge Control Circuit" and U.S. Pat. No. 5,563, 495, entitled "Charging Circuit With Battery Charge Monitor Circuit" for teachings relevant to the implementation of this feature.

In addition, further circuitry associated with the first and second communicators 20, 30 responds to the presence or absence of the second communicator 30 in the cradle 40 so as to simplify communications between a first person within the vehicle and a passenger who wishes to converse with that first person after leaving the vehicle. Preferably, the first and second communicators 20,30 are automatically powered on while the second communicator is not seated in the cradle 40. Equivalently, power can always be on but a squelch circuit can be attenuated or a mute circuit can be deactivated while the second communicator is not seated in the cradle to effectively permit communication between the two communicators. Alternatively or in addition, a synchronized frequency of operation can be established between the first and second communicators 20, 30 while the second communicator 30 is not seated in the cradle 40. Each of these system responses can occur in response to the removal of the second communicator 30 from the cradle 40 (that is, the disengagement of the second communicator's contacts 36 from the contacts 46 in the harness 42) or at a time thereafter, detected by the absence of the second communicator from the cradle.

The removal of the second communicator 30 or its absence from the cradle 40 can be detected electronically in a variety of ways through the contacts 36, 46. Thus, when or while the contacts 36 and 46 are not engaging one another, a change in current, voltage or resistance can be sensed in any conventional manner (e.g., by a continuity check), as understood by those of skill in the art.

Circuitry for coordinating the trickle charge of the second communicator's battery, any automatic power-on, squelch attenuation, or mute deactivation circuitry, and the synchronization of the two communicator's communication channel can be done by circuitry 50 which is separate from the communicators 20,30 (as shown), or by circuitry which is internal to one or both of the two communicators.

The first communicator 20, the second communicator 30, the cradle 40, and the circuitry 50 are preferably included in a vehicle as original equipment. However, these components can be installed as part of an after market kit.

Figure 3:
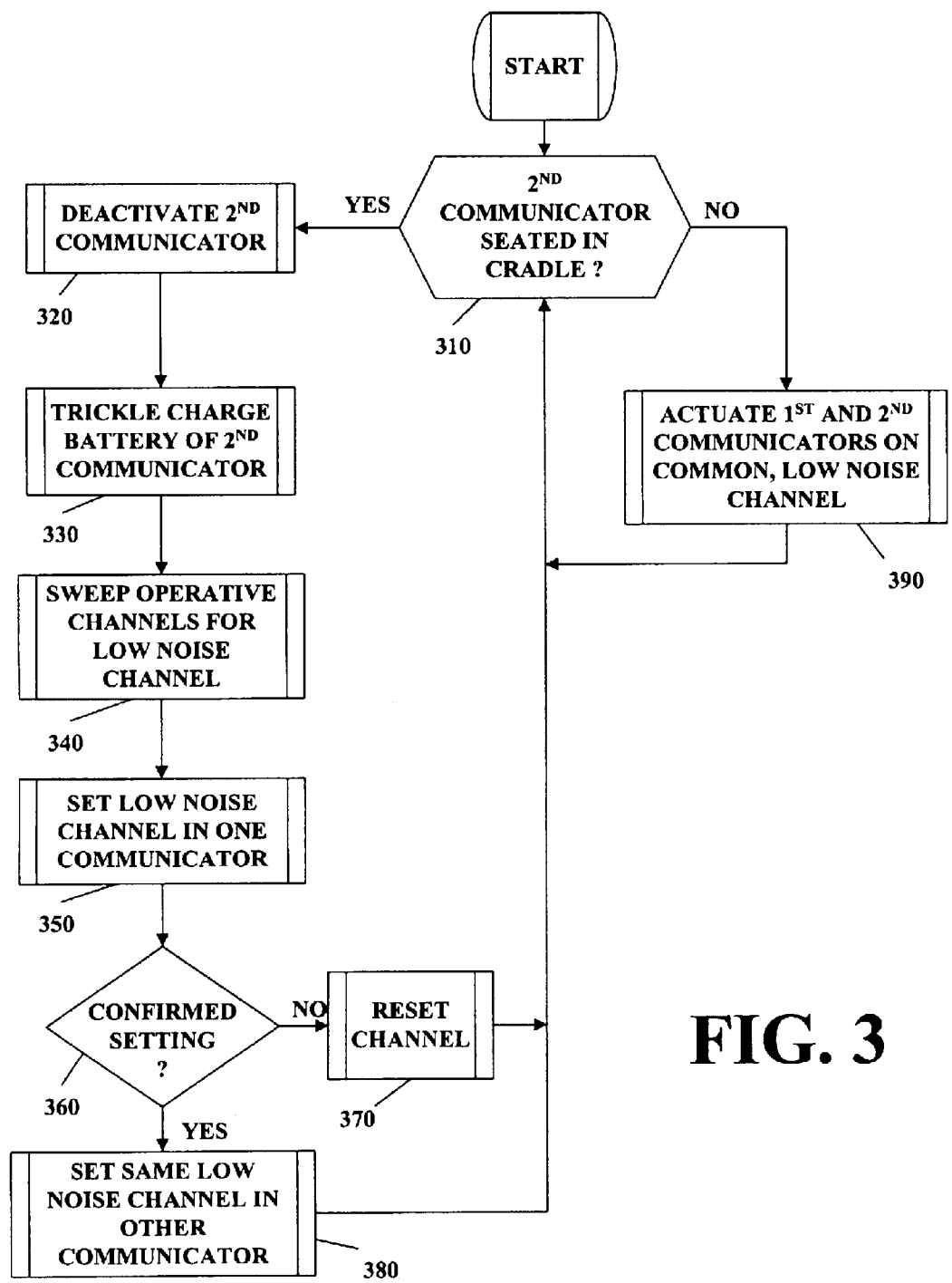
FIG. 3 is a flow diagram illustrating a method for achieving synchronized, low-noise communication between two communicators, one of which is permanently mounted in a car while the other is movable relative thereto.

With reference now to FIG. 3, a method for achieving synchronized, low-noise communication between the first and second communicators 20, 30 is described. The method of the preferred embodiment can operate as a background process of a vehicle LAN or as a stand-alone process. In FIG. 3, the salient method steps are described without regard to any other vehicle process that may be running at the same time or at the direction of the same controller.

At step 310, a test is made to determine whether the second communicator 30 is seated in the harness 42. This test can be achieved by testing the engagement of the mating contacts 36,46 as described above. If the second communicator 30 is in the harness 42, then the preferred embodiment automatically performs a series of processes to ensure that the users are provided with a relatively noise-free and toll free communication channel on which to speak. From time-to-time, a user will unseat the second communicator, use it, and then return it to the harness.

At step 320, the second communicator 30 is deactivated, if it is presently active. The communicator would only be active if it has just been returned to its seat in the cradle 40. Preferably, it is deactivated upon the contacts 36 and 46 engaging one another. As noted above, "activation" and "deactivation" can be synonymous with powering on and powering off the communicators; however, these terms preferably refer to the connection/disconnection of the speakers 22, 32 and/or microphones 24, 34 or to a muting/unmuting or squelching/unsquelching of the signals to and from those components. In any event, step 320 ensures a quiet environment within the vehicle when the communicators are not in service.

At step 330, a trickle charge is applied from the car's electrical system, through the contacts 46 of the cradle, over to the contacts 36 of the second communicator, to charge a battery within the second communicator. This step ensures that the second communicator is always ready for service, though its battery can be exhausted if not returned to the cradle soon enough for further charging.

At step 340, sweep circuitry scans a plurality of channels that are available for use by the communicators and gauges the noise level on each channel. Such circuitry is conventional. See, e.g., U.S. Pat. No. 5,044,010, entitled "Arrangement and Method For Selecting An Available Channel For A Cordless Telephone" for a description of circuitry that identifies and selects one channel among several to use at a given moment and teachings relevant to this step. Once a low noise channel is located, it is set in a selected one of the two communicators, at step 350. For example, the new channel setting can be set in the second communicator 30. Meanwhile, the former channel setting is stored in a register in case the new channel setting cannot be confirmed.

At step 360, a test is made to determine whether the new channel setting was properly set in the selected communicator. It can be that the second communicator 30 is removed in the time interval between the test made at step 310 (In Cradle?) and the new channel setting at step 350. In that case, the new channel setting will not be confirmed, and the process flow is directed to step 370 to reset the former channel setting that was stored in the register. The process flow then loops back to step 310 to test whether the second communicator 30 is seated in the cradle. Because the second communicator can be unexpectedly removed, it is preferred that the new low-noise channel setting initially be attempted in the second communicator 30 since the first communicator 20 can always be set to a new channel.

On the other hand, if the new channel setting is confirmed by the test at step 360, then the same low-noise channel is set in the other one of the two communicators (e.g., the first communicator 20). Then the process flow loops back to step 310 to again test whether the second communicator is seated in the cradle.

In this way, the communication channel on which the first and second communicators operate is tested for noise and repeatedly set to a new, lower noise channel, if any, while the vehicle is driven. Thus, despite any new noise sources that come within the communication range of the communicators, the communicators will be set to a low-noise channel. Meanwhile, a given low-noise channel that is set and confirmed at steps 350 and 380 will only be put into service if the second communicator is removed from the harness 42 prior to another low-noise channel being selected and set in the next loop of steps 310–380.

If the test at step 310 detects that the second communicator has been removed from the cradle, then both communicators are preferably activated and operative on a common, low-noise channel independent of any manual setting by the user. Removal of the second communicator 30 from the cradle 40, therefore, can initiate a synchronization of the two communicators 20, 30 or prevent an out-of-synchronization state from occurring. In other words, the user need not turn on the communicators, find a low-noise channel, or manually set that channel in order to have toll-free communication. Further, communication is established without having to dial any number as with conventional cellular telephones.

Optionally, the first and second communicators can migrate their communication channel to a different channel than the synchronized, low noise channel that was selected and set in both units at a time before the second communicator was removed from the cradle. This can occur, for example, when the communicators operate using a frequency hopping technique such as Bluetooth® or spread spectrum frequency hopping (SSFH). Also, a different channel can be set in both units in response to a change in the noise level on the presently selected channel. The change in channel can proceed automatically at each communicator, in timed sequence or in response to control signals passed therebetween.

One exemplary control signal is described below in connection with a variation of the preferred embodiment. It should be understood that features and aspects of one embodiment can be applied in other embodiments.

In a variation of the foregoing method, the first communicator 20 of one vehicle can communicate with the first communicator in a second vehicle. In this method, the second communicators, if any, are not utilized and need not be provided. Toll-free, vehicle-to-vehicle communication is initiated by transmitting a control signal from one of the vehicles that is picked up by the other. The control signal identifies the transmission frequency that is being used by the initiating vehicle, and permits the recipient vehicle to synchronize its presently operative communication channel to coincide with the transmission frequency of the initiating vehicle. The signal can be, for example, a data packet transmitted in the same frequency band as normal communications, or another signal that is encoded to identify the initiating vehicle's transmission frequency. The first communicators 20 in accordance with this embodiment of the invention can be provided with a transmit button 26 which causes the control signal to transmit its current channel setting. A receive button 28 can be provided for setting the circuitry 50 in a mode to listen for a current channel transmission from another communicator and accept that channel for communication. In this way, two vehicles can establish toll-free local communication. Alternatively, the first communicator in the recipient vehicle can automatically detect the presence of a control signal from an initiating vehicle and notify its occupants that another vehicle is seeking to establish a communication link to that vehicle. The normally operative channel sweep circuitry preferably remains idle or inoperative until this two-vehicle communication mode is terminated (e.g., by pressing a button, removing the second communicator from the cradle 40, turning off the car engine, etc.).

Further channels can be selected and set in both communicators by transmitting control signals between the first communicators of the two vehicles.

Preferably, along with the control signals is a vehicle identifier that identifies the vehicle initiating the control signal transmission. The vehicle identifier is preferably assigned randomly at the time of the initial control signal transmission by the initiating vehicle and remains valid throughout that communication session with the recipient vehicle; however, each vehicle can have its own vehicle identifier to transmit.

While the invention has been described in detail with particular reference to certain embodiments thereof, the invention is capable of other and different embodiments, and its details are capable of modifications in various obvious respects. As would be readily apparent to those skilled in the art, variations and modifications can be affected while remaining within the spirit and scope of the invention. Accordingly, the foregoing disclosure, description, and drawing figures are for illustrative purposes only, and do not in any way limit the invention, which is defined only by the claims.

What is claimed is:

1. In combination with a car, a communication system comprising:
   a) a first communicator fixedly connected to the car;
   b) a harness fixedly connected to the car and having a first set of contacts;
   c) a second communicator having a second set of contacts arranged to engage the first set of contacts when seated in the harness and being movably positionable relative to the car when removed from the harness, the first and second communicators being operable to convey audio messages therebetween over any one of a plurality of channels at any given moment; and
   d) a synchronization circuit coupled to the first communicator and coupled to the second communicator through the harness, the synchronization circuit being operative to synchronize the first and second communicators to a common, low-noise channel while the second communicator is absent from the harness.

2. The communication system as in claim 1, wherein the synchronization circuit synchronizes the first and second communicators in response to the disengagement of the second communicator from the harness.

3. The communication system as in claim 1, wherein the synchronization circuit further comprises sweep circuitry that determines a noise level on each of the plurality of channels, identifies a communication channel having a low-noise level, and sets the first and second communicators to the low-noise level channel.

4. The communication system as in claim 1, wherein the second communicator includes a battery, the system further including a trickle charge circuit coupled to an electrical system in the car and configured to deliver charge to the battery through the second set of contacts.

5. The communication system as in claim 1, further comprising an activation circuit responsive to the absence of the second communicator from the harness by activating the first and second communicators.

6. The communication system as in claim 5, wherein the activation circuit includes a continuity check of at least a portion of the first set of contacts through the harness.

7. A method for communicating with a person in a car from a remote location, comprising the steps of:

a) providing a car with a first communicator and a harness which are both fixedly connected to the car and providing a second communicator movably positionable relative to the car and selectively enagagable with the harness, the first and second communicators being operable to communicate with each other over any one of a plurality of frequencies at any given moment;

b) synchronizing the frequency at which the first and second communicators communicate while the second communicator is absent from the harness; and c) automatically activating the first and second communicators at the synchronized frequency while the second communicator is absent from the harness.

8. The method as in claim 7, wherein the synchronizing step synchronizes the first and second communicators in response to the disengagement of the second communicator from the harness.

9. The method as in claim 7, including the additional steps of sweeping the plurality of channels for a noise level on each channel and identifying a communication channel having a low-noise level, wherein the synchronizing step synchronizes the first and second communicators to the low-noise level channel.

10. The method as in claim 7, including the additional step of trickle charging a battery in the second communicator while the second communicator is engaged with the harness.

11. The method as in claim 7, including the additional step of automatically activating the first and second communicators while the second communicator is absent from the harness.

12. The method as in claim 7, wherein the activating step is in response to the removal of the second communicator from the harness.

* * * * *